Oct. 20, 1931.    A. W. BURWELL    1,828,356
PROCESS OF PRODUCING WATER INSOLUBLE PETROLEUM SOLUBLE
CARBOXYLIC ACIDS AND THE PRODUCT THEREOF
Filed Dec. 20, 1926
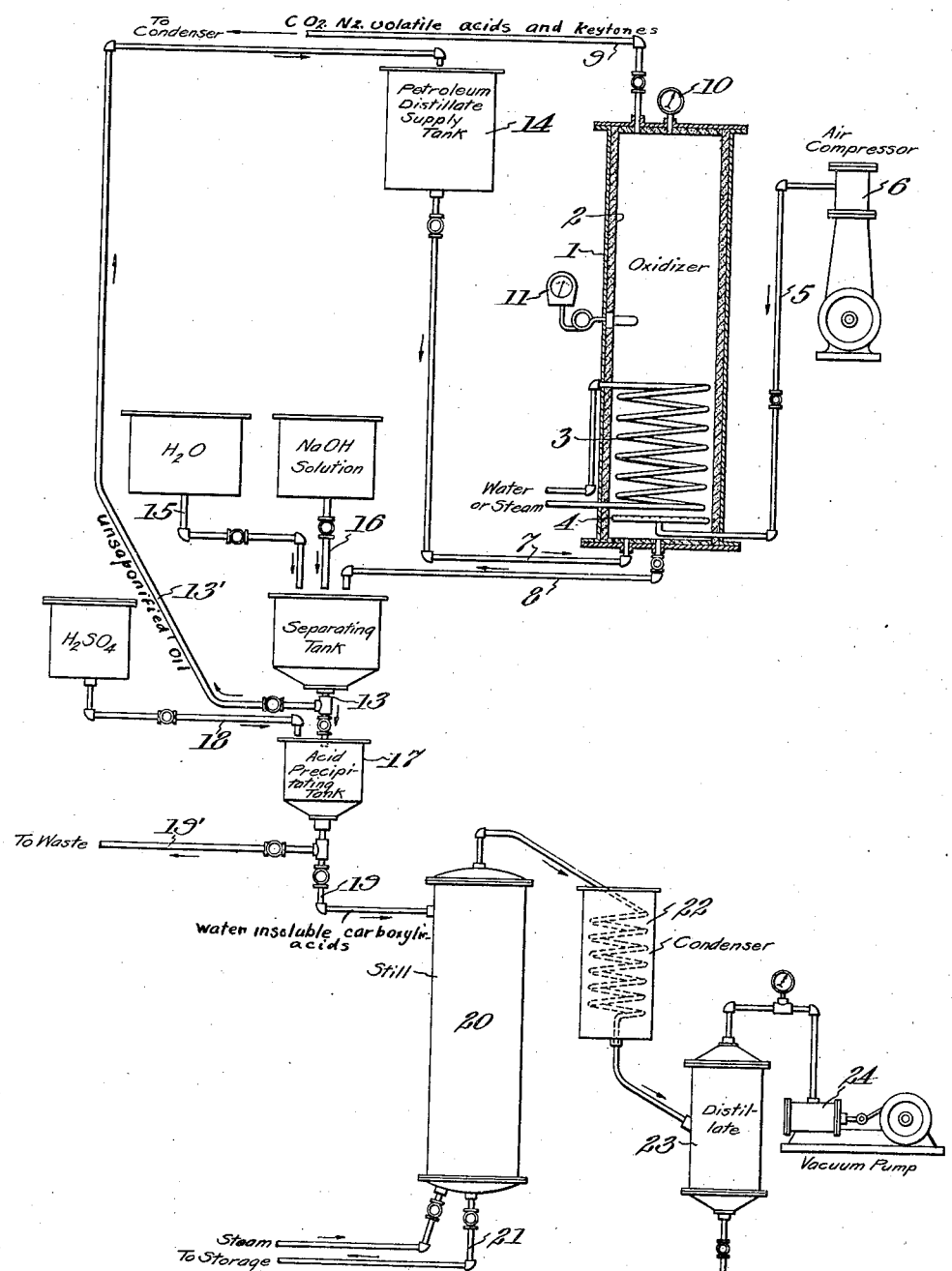

Patented Oct. 20, 1931

1,828,356

UNITED STATES PATENT OFFICE

ARTHUR W. BURWELL, OF NIAGARA FALLS, NEW YORK, ASSIGNOR TO ALOX CHEMICAL CORPORATION, OF NEW YORK, N. Y., A CORPORATION OF NEW YORK

PROCESS OF PRODUCING WATER-INSOLUBLE PETROLEUM-SOLUBLE CARBOXYLIC ACIDS AND THE PRODUCT THEREOF

Application filed December 20, 1926. Serial No. 156,053.

This invention relates to products particularly adapted for use in coating compositions containing nitrocellulose and to the process of making the same.

In the preparation of artificial leather compositions, it is customary to spread upon a fabric base a coating composition comprising a solution of nitro-cellulose in ethyl acetate, butyl acetate or other suitable solvent, together with diluents such as, for example, benzol, alcohol, gasoline or the like, pigments and other fillers, and an oil or oils of the nature of castor oil. The benzol, alcohol, and gasoline are used as diluents as they alone are not solvents for nitro-cellulose. The oil or oils present in the composition have the property of softening, or altering the physical characteristics of, the nitro-cellulose whereby the dry coating, obtained upon evaporation of the volatile solvents and diluents, remains soft and flexible.

The relatively high cost of castor oil precludes the use of this softening agent in many instances, and substitutes therefor have been sought. For example, it has been attempted to substitute for castor oil the so-called "blown oils". The chief drawbacks to the use of "blown oils" are their powerful rancid odor and the fact that they can only be incorporated in artificial leather compositions in somewhat restricted proportions as compared with castor oil.

An object of the present invention is to provide a softening agent for compositions containing nitro-cellulose which may be incorporated in such compositions in almost unrestricted proportions, is more economical in cost than castor oil, and is practically free from objectionable odor. The invention has particular application to the production of artificial leather compositions.

I have found that, by the liquid-phase oxidation, under controlled conditions, of hydrocarbons or mixtures thereof such as those occurring in petroleum oils, there may be obtained organic carboxylic acid products from which a valuable softening agent may be obtained, which softening agent is equal, and in many cases superior, to castor oil in coating compositions containing nitro-cellulose.

More particularly, the present invention concerns the saponifiable carboxylic acid products obtained by the controlled oxidation of mid-continent or Pennsylvania petroleum distillates having a density of from about 50° to 40° Baumé, although I have found that these acid products are obtainable from other petroleum distillates than those just mentioned.

The process of making these saponifiable carboxylic acid products consists generally in the liquid-phase oxidation of hydrocarbons or mixtures thereof, including both light and heavy petroleum distillates and other petroleum hydrocarbon products, under such conditions as to limit the formation of compounds insoluble in the partially oxidized mass and the isolation of the acid bodies from the partially oxidized mass.

Although this invention is not restricted to use of any particular hydrocarbon or mixture of hydrocarbons, I prefer to use as starting material petroleum distillates having densities of approximately 48°–43° Baumé at 16° C. Especially suitable is the 45° Baumé distillate known as kerosene. This particular petroleum fraction has a distillation range substantially as follows:

| Distillate c. c. | Temp. °C. | Time min. |
|---|---|---|
| Start | 173.0 | |
| 10 c. c. | 181.0 | 2 |
| 20 | 181.5 | 5 |
| 30 | 191.0 | 8 |
| 40 | 196.5 | 5 |
| 50 | 197.5 | 5 |
| 60 | 205.0 | 3 |
| 70 | 209.5 | 6 |
| 80 | 212.0 | 7 |
| 90 | 220.0 | 5 |
| 100 | 223.0 | 4 |
| 110 | 227.5 | 7 |
| 120 | 233.5 | 4 |
| 130 | 235.0 | 5 |
| 140 | 246.0 | 6 |
| 150 | 250.0 | 8 |
| 160 | 255.0 | 6 |
| 170 | 267.0 | 8 |
| 180 | 276.0 | 6 |
| 190 | 297.0 | 5 |
| 200 | | |

When a petroleum distillate of the above type and character is subjected to oxidation in the liquid phase, under controlled conditions, there are formed saponifiable, water-insoluble carboxylic acid bodies which are soluble in the petroleum distillate, with or without the presence of water-soluble carboxylic acids of relatively low molecular weight. The water-insoluble carboxylic acid bodies may be removed from the solution by various methods, as for example, by treating the solution comprising the said acid bodies and unoxidized petroleum distillate with an aqueous solution of an alkali, thus forming alkali metal soaps of the said acids, separating the soaps from the unoxidized material, decomposing the soaps by treatment with a suitable acid, and isolating the thus purified and liberated acids.

The invention will be described and illustrated hereinafter by reference to a batch process. It is to be understood, however, that the procedure may be made continuous, as shall be explained.

In the accompanying drawing there is shown diagrammatically one form of apparatus suitable for use in carrying out the process of the invention.

The oxidation step proper takes place in an upright cylindrical reaction vessel or oxidizer 1, which may be, for example, about 5 feet in diameter and about 16 to 18 feet in height. The oxidizer 1 may be made of any suitable material such as iron or steel and should be capable of withstanding pressures up to 350 pounds per square inch. Preferably, the oxidizer 1 should be made of or lined with material which is resistant to the corrosive action of the reaction mixture; for example, provided with an inner shell of aluminum 2. The oxidizer is provided at a point near its lower end with a tight coil 3 which serves as a heating or cooling coil as required. Suitable means, not illustrated, such as a jacket surrounding the oxidizer, also may be used to control the temperature of the oxidation reaction. At a point between the lower end of the oxidizer 1 and the tight coil 3 is an air spray pipe 4 connected by pipe line 5 to an air compressor 6. Air spray pipe 4 is so designed that air is ejected from it in the form of fine bubbles. 7, 8 and 9 are a valved hydrocarbon supply pipe, a valved liquid discharge pipe and a valved gas discharge pipe, respectively. 10 is a pressure gauge, and 11 is a thermometer. 12 is a separating tank fed by the valved liquid discharge pipe 8 leading from the oxidizer 1; said tank being provided with agitating means (not shown).

From the bottom of the separating tank 12 extend the valved conduits 13 and 13' for the transference of fluids to the acid precipitating tank 17 and to the petroleum distillate supply tank 14, respectively. The tank 17 may be of any suitable material (e. g. of lead) adapted to withstand the corrosive action of strong acids. 15 and 16 are valved supply pipes for conducting water and sodium hydroxide solutions respectively to the separating tank 12. 18 is a valved supply pipe for conducting sulfuric acid to the tank 17. The valved discharge line 19' leads to waste and the valved discharge line 19 leads to the still 20 which is provided with the valved discharge conduit 21. 22 is a condenser, 23 is a distillate receiver and 24 is a vacuum pump.

The process is carried out in the apparatus illustrated as follows:

A petroleum hydrocarbon oil, such as, for example, the 45° Baumé distillate above described, is charged into oxidizer 1, a small amount of an oxidizing catalyst or exciter of oxidation such as a compound of manganese copper or iron, say manganese oleateamounting to about 0.1 percent of the weight of the oil is added and the mixture heated up to a temperature in the neighborhood of 120° C. or higher, preferably to about 135–140° C., and an oxidizing gas, preferably air, is supplied through the spray pipe 4. Gases are permitted to accumulate in the oxidizer until the desired pressure is reached, after which the pressure is maintained or regulated by controlling the discharge of gases through the valved gas discharge pipe 9. The pressure may vary considerably, say from 150 to 350 pounds per square inch. The preferred pressure will depend upon a number of conditions, including the temperature maintained, the kind of hydrocarbon mixture under treatment, the rate of air supply and, if oxygen-enriched air is used, upon the richness of the oxygen supply. It is preferred to carry out the oxidation process under such conditions that the reaction is substantially self-sustaining. In general, the reaction is self-sustaining at a temperature of about 135°–140° C., and at a pressure of about 250 pounds per square inch, with the hydrocarbon under treatment, although temperatures and pressures may vary between wide limits. Thus, for example, oxidation has been observed at a temperature as low as 100° C.; it is more rapid above 120° C., and the temperature may be allowed to rise to 155° C. with satisfactory results under some circumstances. Therefore, while I prefer to carry out the oxidation process at a temperature at which the reaction rate is fairly rapid, say 135°–140° C., it is to be understood that the invention includes the employment of all suitable temperatures at which oxidation takes place.

During the oxidizing treatment, as is stated above, gases collecting in the upper end of oxidizer 1 are released through the pipe 9. These gases contain practically no oxygen, but do contain carbon dioxide, nitrogen and varying quantities of volatile acids, ketones and other products of the oxidation. The volatile acids, ketones and other products may be condensed in a suitable condenser (not shown) and further treated for the recovery of formic acid, mixed light ketones, etc.

During the course of the treatment of the petroleum distillate in the oxidizer 1, there appear to be formed, during the earliest stages of oxidation, formic acid and high molecular weight ketonic and/or aldehydic bodies; continued oxidation results in the production of saponifiable carboxylic acids soluble in the petroleum hydrocarbons and having molecular weights approximately one and one-half times those which would naturally be calculated for acids derived from the original (i. e. unoxidized) hydrocarbons. Prolonged oxidation converts these petroleum-soluble carboxylic acids into petroleum-insoluble hydroxy-carboxylic acids having about the same molecular weights as those which would naturally be calculated for acids derived from the original hydrocarbons, low molecular-weight ketonic and/or aldehydic bodies, and additional amounts of formic acid. For the purposes of the present invention it is desirable to continue the oxidation treatment until the maximum amount of the saponifiable, high molecular weight, carboxylic acids soluble in the petroleum hydrocarbons has been obtained while avoiding the formation of petroleum-insoluble hydroxy-carboxylic acids. The formation of the latter-named compounds depends upon several factors, principally the presence, or absence, in the starting material, of crystallizable bodies (e. g. wax) and hydrocarbon compounds having a high molecular weight. That is to say, the higher the percentage of non-crystallizable bodies composing the starting material (i. e. petroleum hydrocarbon mixtures), and the lower the molecular weights of these bodies, the more prone this starting material is to form petroleum-insoluble hydroxy-carboxylic acids, and vice versa. Therefore, in the present instance, the oxidation of 45° Baumé petroleum distillate (i. e., kerosene) should be carried only to about 20% complete oxidation. The preferred degree of oxidation may be controlled by titration, or by observing the incipient formation of the petroleum-insoluble bodies.

The oily mixture obtained according to the above procedure is removed from the oxidizer 1 through the valved liquid discharge pipe 8 into the separating tank 12, and washed with water. This washing operation has for its purpose the removal of water-soluble bodies. After the withdrawal of the wash water, sufficient dilute caustic soda is introduced, through the valved supply pipe 16, to exactly neutralize the water-insoluble acids present in the oily mixture and the mixture is agitated, forming thereby a solution of sodium soaps of the carboxylic acids. After the soap solution has settled to some extent a test is made to determine whether or not the aqueous soap solution is of such a high concentration as to hold, perhaps in colloidal solution or suspension,—any of the unsaponified oils. In the event that the said soap solution is of such concentration, it is sufficiently diluted with water, introduced, for example, through valved supply pipe 15, to cause the separation of the said unsaponified oils. The whole mass is then allowed to settle until both the oil and the soap solutions are clear. The separated soap solution is drawn off, through the valved conduit 13, into the acid precipitating tank 17.

The supernatant unsaponified oil, consisting usually of from 68–80% of the total mass, is drawn off, through the valved conduit 13, to the petroleum distillate supply tank 14 for admixture with additional quantities of fresh distillate, and is again subjected to the oxidizing treatment in the oxidizer 1. It is a fact worthy of notice that the petroleum hydrocarbon mixture comprising in part the material which has already been subjected to treatment does not require the presence of an oxidizing catalyst or exciter of oxidation to effect normal oxidation, the oxidation proceeding in a manner identical to that observable upon oxidizing a fresh charge of the starting material containing an added exciter of oxidation.

The clear soap solution in the acid precipitating tank 17 is decomposed by treatment with a sufficient amount of a suitable acid, for example sulfuric acid, in a manner substantially as follows: Into the soap solution, agitated by any suitable means (for instance, by a stream of air), there is introduced gradually, through the valved supply pipe 18, an amount of sulfuric acid sufficient to decompose all of the soap, or slightly in excess of that amount. The completion of this operation may be determined by observation, or by the use of Congo paper or other similar means of testing. When testing for the completion of the decomposition with Congo paper, the reaction should not be considered complete at the first indication of color change in the test paper, but the addition of acid should be continued until the color change is very strong. By following this procedure the soap is completely decomposed with the production of an oily mixture containing purified free water-insoluble carboxylic acids and an aqueous solution containing sodium sulfate. The slight excess of sulfuric acid referred to serves to promote a clean separation. After settling, the contents of the acid precipitating tank 17 is found to comprise two well-separated layers; the one comprising the oily mixture containing purified water-insoluble carboxylic acids having a specific gravity between .945 and 1.0, and the other comprising an aqueous solution containing sodium sulfate. The latter solution is discharged through the valved discharge line 19'.

The oily mixture thus obtained contains some volatile bodies which might depreciate the value of the product as a softening agent for nitro-cellulose compositions, if allowed to remain therein, consequently it is preferable to remove such volatile bodies. As one manner in which this operation may be effected, I prefer to subject the oily mixture to vacuum distillation and to a treatment with steam substantially as follows:

The oily mixture is withdrawn from the acid precipitating tank 17, through the valved discharge line 19, into a still 20 wherein it is distilled at a temperature not exceeding about 150° C., under a pressure of from 10–20 mm. of mercury, and in an atmosphere of superheated steam, air or other suitable inert gas.

Under the above conditions, the said volatile bodies contained in the oily mixture are volatilized and carried out of the still 20 under the influence of the partial vacuum created by the vacuum pump 24, condensed in the condenser 22 and caught in the distillate receiver 23. Following the vacuum distillation the liquid residue is subjected to treatment with a rather rapid current of steam, in order to sweep out all bodies volatile at the temperature and pressure used, leaving the purified softening agent. Depending upon the temperature at which the steam treatment (i. e. "sweetening") is conducted, the specific gravity of the purified product obtained from 45° Baumé fuel distillate will be found to be between 1.0110 and 1.0150.

The vacuum distillation and subsequent steam treatment should be conducted under such conditions as not to allow over-heating of the carboxylic acids, since temperatures of about 160° to 175° C. apparently cause some undesirable polymerization and/or decomposition. In general, it may be stated that the lower the temperature to which the oily mixture is raised for the complete removal of all bodies which, at room temperature or somewhat higher, will volatilize over a long period of time (e. g., a year or more), the better the grade of softening agent produced. Also, it is to be noted that the higher the viscosity of the finished product the better, for the reason that larger proportions of the softening agent may be admixed with the nitro-cellulose.

In preparing nitro-cellulose coating compositions containing the above-described softening agent, I have found that the latter may be introduced in amounts up to 95% of the total composition without detriment, although I prefer to incorporate about 70–80% of the softening agent with about 25–15% of nitro-cellulose and about 5% of pigments and filler, depending upon the desired relative softness or stiffness of the composition. The economic advantage in the use of compositions containing these relatively high proportions of softening agent is especially obvious when it is considered that the softening agent is considerably less expensive than either the castor oil or the nitro-cellulose since it is known that ordinary castor oil can not be introduced into the nitro-cellulose coating composition in an amount exceeding about 55% of the total composition without detrimental "sweating" or separation. The ability to blend with very small proportions of nitro-cellulose to the production of stable, non-separating dispersions characterizes this softening agent in contradistinction to castor oil or the so-called "blown oils".

Another characteristic of the new carboxylic acids comprising the above-described softening agents is that they may be esterified, by any of the methods commonly practiced for esterifying fatty acids generally, thereby producing esters having properties very similar to castor oil and adaptable for use as a substitute for castor oil in numerous relations.

While the above-described procedure for preparing the softening agent has been set out as a batch process, it is to be understood that the invention is not restricted thereto, and that the process may be made a continuous or cyclic process with obvious economic advantages. For example, a body of distillate may be subjected to controlled partial oxidation while moving through the oxidizer, the reaction mixture containing petroleum-soluble carboxylic acids may be contacted with,—for instance blown in the form of a spray into,—a solution of a caustic alkali, the reaction mixture continuously transferred to a separating tank from which unoxidized oil and soap solution may be separately removed, the unoxidized oil continuously removed from the separating tank and returned to the body of distillate, and the soap solution decomposed and the resulting free carboxylic acids purified in the regular manner.

While the production of the hereinbefore described softening agent is not restricted to any particular theory of oxidation reactions, the following is advanced as being a probable explanation of said reactions:

In regard to the reactions which may take place during the controlled oxidation of petroleum hydrocarbon mixtures by means of air under pressure at reacting temperatures, it is thought that the main primary reaction is one in which the oxygen attaches itself to a secondary carbon atom in the hydrocarbon chain and, in general, it is believed that the first secondary carbon atom after the primary carbon atom,—in other words, the carbon atom in the $\beta$-position to the $CH_3$ group at the end of any chain or branch,—is the one to which the oxygen first attaches itself. It is further the opinion, from many observations, that the oxygen is absorbed without the loss of any hydrogen; in other words, a hydroxyl group is formed at this point, thus forming a secondary alcohol.

The principal reason for assuming that this is the case is the fact that with the oxidation of a given mass of petroleum there is obtained as high as 15% of formic acid and it is believed that this is due to the end hydrocarbon radical being eliminated in the form of formic acid by the oxidation of a ketone formed from the secondary alcohol in which the hydroxyl is attached to the carbon atom. The above conclusion is supported by the fact that when a secondary alcohol is oxidized it first forms a ketone. When a ketone which is a "methyl X ketone",—that is, one in which the methyl group is on one side of the CO group and a group of very much higher molecular weight is on the other side of the CO group,—such ketone oxidizes in such manner as to leave the CO group attached to the larger molecule, the CO group thus becoming the carboxylic group of the high molecular weight acids and the $CH_3$ group forming formic acid. The rule in other words is that when ketones are oxidized the CO group attaches itself to the radical of higher molecular weight and the group of lower molecular weight is oxidized to the corresponding acid containing only the total number of carbon atoms which that group has minus the CO group.

This view is further supported by the fact that of the oil remaining after removal of all easily volatile and all acid products the greater proportion forms crystalline compounds with bisulphite, indicating the presence of rather large amounts of ketones or aldehydes but, as before stated, the opinion inclines to the formation of ketones rather than aldehydes because of the very large production of formic acid. When it is considered that one is treating hydrocarbons with an average composition around $C_{20}H_{42}$ and that one obtains as high as 15% of actual formic acid there seems to be almost no other explanation for the main or principal reaction.

It has also been found that the mixture of acids produced under conditions tending to avoid production of hydroxy acids shows a molecular weight which, in most cases, corresponds to hydrocarbons of about 50% higher molecular weight than those chosen for the oxidation. This may be accounted for in two possible ways. There may be incipient oxidation in the end hydrocarbons,—that is, of the methyl group of the hydrocarbons,—in such a way as to effect what is known as the Kolbe reaction. If simultaneously, by an atom of oxygen, two hydrocarbon molecules are so oxidized that the methyl group, in the case of each molecule, loses one hydrogen atom we would have a synthesis immediately of the two hydrocarbon molecules forming one of twice the molecular weight less two hydrogen atoms. The other possible explanation, which woud appear to be the stronger, is as follows: The acids when first formed are extremely liable to further oxidation and as in practically all cases one would have at the other end of a straight chain, or at any other branch, a carbon atom in relatively the same position as the first secondary carbon atom which had been oxidized to ketone and acid which also would be oxidized, probably almost simultaneously, to an alcohol. The acid in one case would either form a lactone with itself or would form an ester with the alcohol at the other end of the same chain in another molecule of the same or other acid, thus forming an ester-acid and, as the acids of lower molecular weight are frequently much more active in ester formation than those of higher molecular weight, it is probable that there would be a synthesis of this kind producing an average molecular weight of about 50% higher value than the simple acid theory would account for.

It seems proper to infer, from the above theory, that the oxidation reactions occur in such manner that very large molecules are formed by the esterification of hydroxy-acids by acids of the same, or higher, or lower, molecular weight, thus forming almost endless chains. Separations by partial precipitation have been obtained from acids which show an average molecular weight of about 360, acids having molecular weights as high as 800 and, from the same mixture there have been precipitated acids having molecular weights as low as 100. This is particularly true where the oxidation has been carried far enough to form petroleum-insoluble hydroxy-carboxylic acids. This would very naturally be the case since it is just these acids which one knows are the hydroxy-acids as they show a considerable absorption of acetyl and we have now proof of their polymerization either through esterization or through polymerization due to the fact that they have the hydroxy-group. This hydroxy group also may readily become a ketone group, as is readily perceivable. Ketones in themselves are also extremely active; especially, the higher ketones show a great tendency to polymerize. This may be an added cause for the production of acids of extremely high molecular weight.

An additional fact which supports the idea of ester acids or ketone acids being formed, is that, if these higher molecular weight acids are distilled without too much destruction, there are obtained mixtures of lower molecular weight acids and ketones with some small quantities of hydrocarbons. The principal amount of material, however, comprises acids of lower molecular weight than those put in the still and ketones of not very high molecular weight. This would appear to support the ester acids hypothesis.

This application contains subject matter in common with my applications:
Serial No. 588,073, filed Sept. 13, 1922 now Patent No. 1,690,768;
Serial No. 642,638, filed May 31, 1923 now Patent No. 1,690,769;
Serial No. 156,052, filed Dec. 20, 1926 now Patent No. 1,770,875
and therefore is a continuation in part of said applications.

I claim:

1. Process which comprises contacting an oxidizing gas with a petroleum hydrocarbon mixture in liquid state at a reactive temperature above 100° C. and not substantially above 155° C. and at a pressure greater than atmospheric pressure but substantially not above 350 pounds per square inch, producing thereby oxidation products including water-insoluble, saponifiable carboxylic acids which are soluble in the hydrocarbon mixture, continuing the oxidation so long as to give a maximum yield of said water-insoluble petroleum-soluble carboxylic acids while avoiding the formation of petroleum-insoluble acids, saponifying the said acids, separating the resulting soaps from the hydrocarbon mixture, decomposing the soaps by treatment with an acid and separating the free acids thus obtained from the reaction mixture, and subjecting the said acids to vacuum distillation and a treatment with steam.

2. Process which comprises contacting a free-oxygen-containing gas with a petroleum hydrocarbon mixture in liquid state at a reactive temperature above 100° C. but not substantially above 155° C. and at a pressure greater than atmospheric pressure but substantially not above 350 pounds per square inch, producing thereby oxidation products including water-insoluble, saponifiable carboxylic acids which are soluble in the hydrocarbon mixture, continuing the oxidation only so long as to give a maximum yield of said water-insoluble petroleum-soluble carboxylic acids while avoiding the formation of petroleum-insoluble acids, saponifying the said acids, separating the resulting soaps from the hydrocarbon mixture, decomposing the soaps by treatment with an acid and separating the free acids thus obtained from the reaction mixture.

3. Process which comprises contacting a free-oxygen-containing gas, in the presence of an exciter of oxidation, with a petroleum hydrocarbon mixture in liquid state at a reactive temperature above 100° C. and not substantially above 155° C. and at a pressure greater than atmospheric pressure but substantially not above 350 pounds per square inch, producing thereby oxidation products including water-insoluble, saponifiable carboxylic acids which are soluble in the hydrocarbon mixture, continuing the oxidation only so long as to give a maximum yield of said water-insoluble petroleum soluble carboxylic acids while avoiding the formation of petroleum-insoluble acids, saponifying of petroleum-insoluble acids, saponifying the said acids, separating the resulting soaps from the hydrocarbon mixture, decomposing the soaps by treatment with an acid and separating the free acids thus obtained from the reaction mixture.

4. Process which comprises contacting a petroleum distillate with a free-oxygen-containing gas at a reactive temperature above 100° C. and not substantially above 155° C. and at a pressure greater than atmospheric pressure but substantially not above 350 pounds per square inch, in the presence of an added exciter of oxidation, separating the resulting acids from unsaponified reaction mixture residue, mixing the separated unsaponified reaction mixture residue with fresh petroleum distillate and treating the resulting mixture with a free-oxygen-containing gas at a reactive temperature above 100° C. but not substantially above 155° C. and at a pressure greater than atmospheric pressure but substantially not above 350 pounds per square inch.

5. As a new product, a material comprising water-insoluble carboxylic acids substantially identical with those obtainable by contacting a free-oxygen-containing gas with a petroleum hydrocarbon mixture in liquid state at a reactive temperature above 100° C. but not substantially above 155° C. and at a pressure greater than atmospheric pressure but substantially not above 350 pounds per square inch, producing thereby oxidation products including water-insoluble, saponifiable carboxylic acids which are soluble in the hydrocarbon mixture, continuing the oxidation only so long as to give a maximum yield of said water-insoluble petroleum-soluble carboxylic acids while avoiding the formation of petroleum-insoluble acids, saponifying the said acids, separating the resulting soaps from the hydrocarbon mixture, decomposing the soaps by treatment with an acid and separating the free acids thus obtained from the reaction mixture.

6. As a new product, a material comprising water-insoluble carboxylic acids substantially identical with those obtainable by contacting a free-oxygen-containing gas with a petroleum hydrocarbon mixture consisting of a 48°–43° Baumé petroleum distillate in liquid state at a reactive temperature above 100° C. and not substantially above 155° C. and at a pressure greater than atmospheric pressure but substantially not above 350 pounds per square inch, producing thereby oxidation products including water-insoluble, saponifiable carboxylic acids which are soluble in the hydrocarbon mixture, continuing the oxidation only so long as to give a maximum yield of said water-insoluble petroleum-soluble carboxylic acids while avoiding the formation of petroleum-insoluble acids, saponifying the said acids, separating the resulting soaps from the hydrocarbon mixture, decomposing the soaps by treatment with an acid and separating the free acids thus obtained from the reaction mixture.

In testimony whereof, I affix my signature.

ARTHUR W. BURWELL.